Aug. 24, 1943.  H. W. KLEIST  2,327,355
SODA FOUNTAIN
Filed Oct. 30, 1940    2 Sheets-Sheet 1
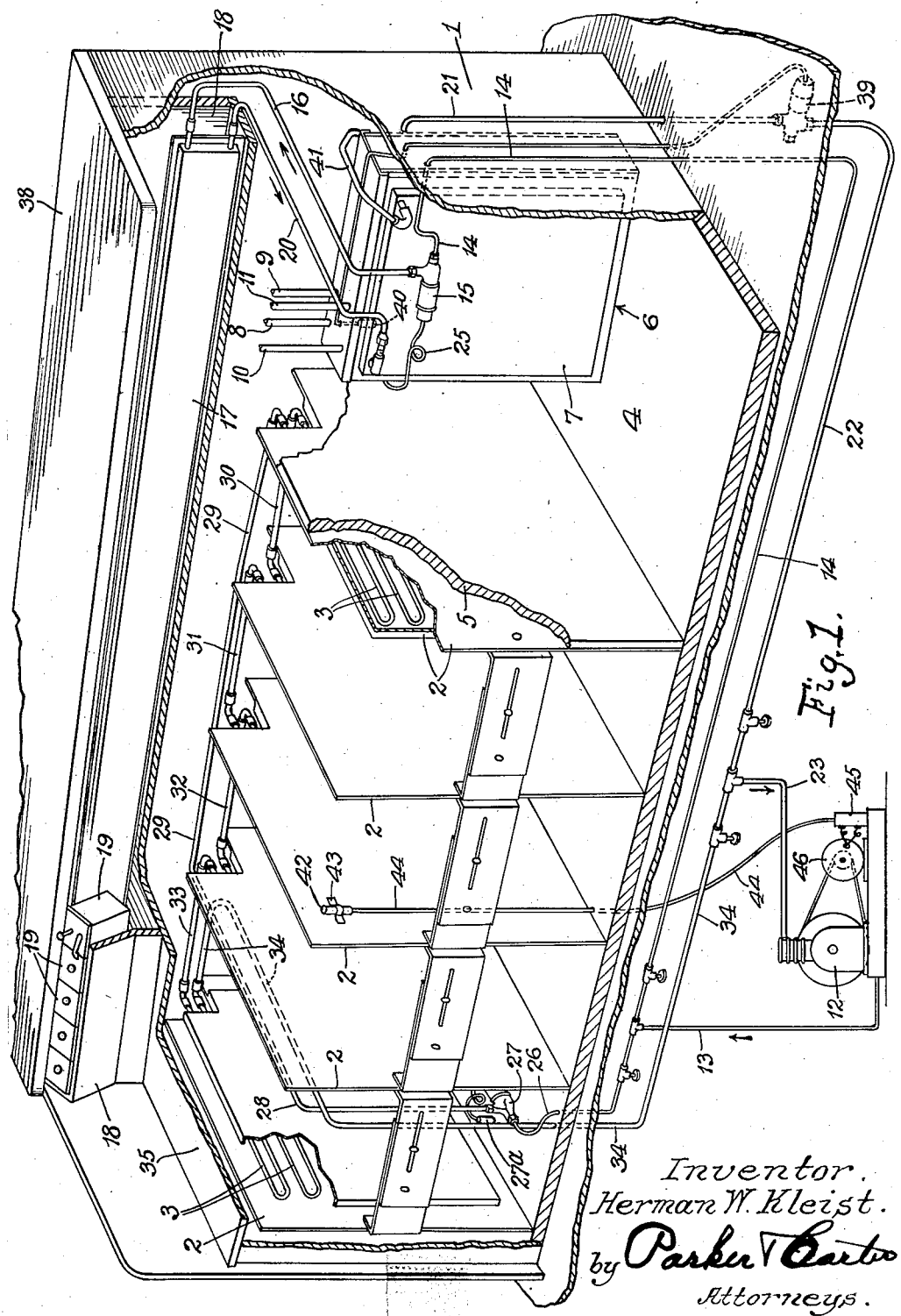
Inventor.
Herman W. Kleist.
by Parker & Carter
Attorneys.

Aug. 24, 1943.  H. W. KLEIST  2,327,355
SODA FOUNTAIN
Filed Oct. 30, 1940  2 Sheets-Sheet 2
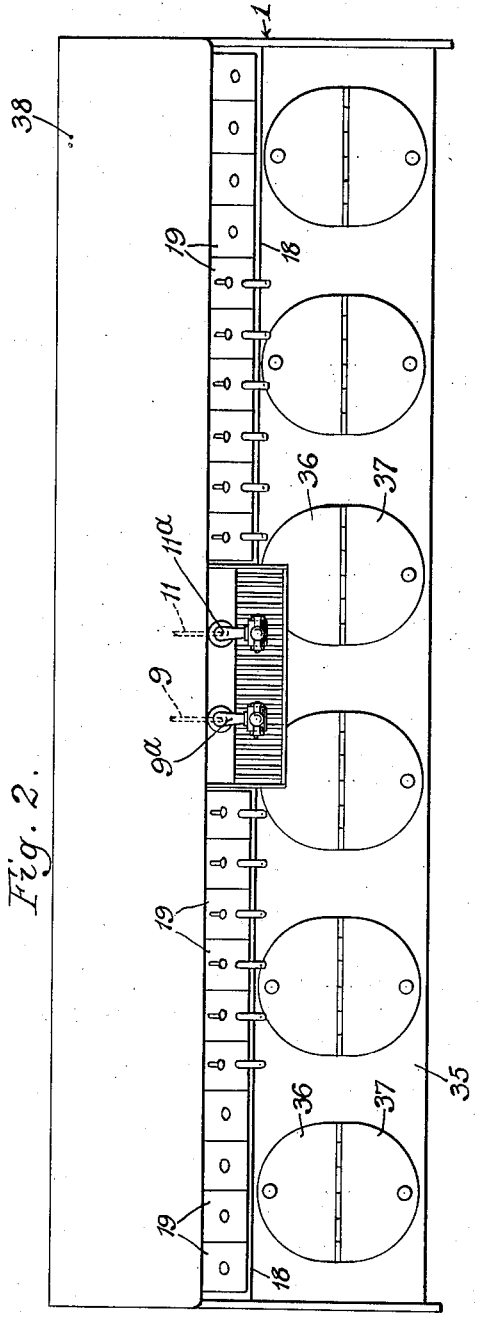
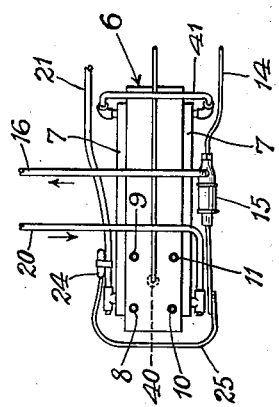
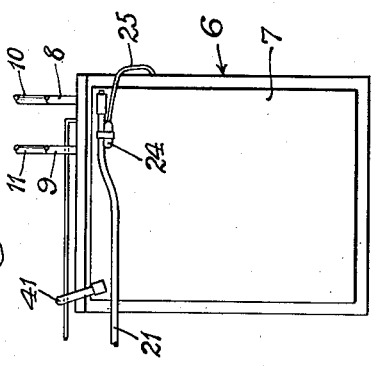
Inventor.
Herman W. Kleist.
by Parker & Carter
Attorneys.

Patented Aug. 24, 1943

2,327,355

UNITED STATES PATENT OFFICE 2,327,355

SODA FOUNTAIN

Herman W. Kleist, Chicago, Ill., assignor to Dole Refrigerating Company, Chicago, Ill., a corporation of Illinois Application October 30, 1940, Serial No. 363,575

1 Claim. (Cl. 62—4)

This invention relates to soda fountains and has for its object to provide a new and improved device of this description.

The soda fountains now in use have a number of different kinds of sirup and this sirup must be kept at a proper low temperature. The invention has as a further object to provide means for doing this. The invention has as a further object to provide a soda fountain with means for cooling the ice cream section, the water, the soda water and the sirup. The invention has as a further object to provide a soda fountain with a cooling apparatus for cooling the ice cream section, the water, the soda water and the sirup, which will greatly reduce the number of times the apparatus cycles in a given period and which will still keep the ice cream section, the water, the soda water and the sirup at the proper low temperature. The invention has further objects which are more particularly pointed out in the accompanying description.

Referring now to the drawing,

Fig. 1 is a perspective view of a soda fountain, with parts broken away;

Fig. 2 is a plan view;

Fig. 3 is a rear elevation of the water and soda water cooler;

Fig. 4 is a plan view of the device of Fig. 3.

Like numerals refer to like parts throughout the several figures.

In this construction there is a suitable insulated casing 1 in which the apparatus is located. In this casing there is provided an ice cream compartment having a series of cold plates 2, which are preferably holdover vacuum plates which consist of a hermetically sealed tank containing a coil 3 extending back and forth therein which is connected with a compressor and through which the refrigerant material passes, there being a eutectic in the tank which partially fills it. This tank has air withdrawn from it so as to produce a vacuum or partial vacuum which causes the sides of the tank to be tightly pressed against the coil 3. This ice cream compartment is arranged to be kept at a temperature of from minus five degrees Fahrenheit to five degrees Fahrenheit.

There is a second compartment 4 for bottled goods and which is separated from the ice cream compartment by the wall 5 of insulating material. This compartment is kept at a temperature of from thirty-five degrees Fahrenheit to forty degrees Fahrenheit. Within this compartment is located a water and a soda water cooler 6 of the type shown in my application No. 278,419 filed June 10, 1939, which consists of one or more holdover plates 7 similar to the plates 2, which are arranged to form a receptacle or compartment in which coils are located in proximity to the cooling plate or plates, so that as the water and soda water pass through these coils, the water and soda water are cooled. The water enters the coil in this compartment through the pipe 8 and passes out through the pipe 9 to the draft arm 9a. The soda water passes into the coil in this compartment through the pipe 10 and passes out to the draft arm 11a through the pipe 11.

The refrigerant passes from the compressor 12 through the pipe 13 to the pipe 14 and the thermostatic expansion valve 15 and then passes through the pipe 16 into the holdover sirup rail plate 17. This plate consists of a hermetically sealed tank extending longitudinally along the sirup jars, with a coil therein and with a eutectic filling a portion of the tank, with a part of the air withdrawn so as to cause the sides of the tank to tightly press against the coil. There is a sirup jar receptacle 18 of insulating material which has a series of sirup jars 19 located therein so as to be cooled by this holdover plate 17. The sirup in these sirup jars must be kept at a considerably higher temperature than the ice cream. The ice cream receptacle, for example, may be kept in the neighborhood of zero degrees Fahrenheit, whereas the sirup must be kept in the neighborhood of thirty-five to forty degrees Fahrenheit, so that it will not freeze and so that it will be cool enough so it will not warm up the drink and so that it will be kept cool enough not to spoil. In a device of this kind there is a cycling apparatus which causes the compressor to operate to secure a certain predetermined temperature and then to be shut off for a considerable time and then start up again. With the ordinary cooling device for the sirup, when the compressor is stopped, the sirup will become warm and will warm up the drink and it is very liable to spoil. With the present device this is entirely avoided.

The refrigerant material after passing through the coil in plate 17 passes out through the pipe 20 and thence through a coil in the water and soda water cooling device, shown in Figs. 3 and 4, and thence through pipe 21 and pipe 22 to pipe 23 and thence back to the compressor 12. There is a control bulb 24 associated with the return pipe 20 and connected by a pipe 25 with the expansion valve 15 so as to control the passage of the refrigerant material to the plate 17 through this expansion valve by means of the temperature of the refrigerant material in the pipe 21.

The refrigerant material passes to the ice cream cooling plates 2 from the compressor through the pipe 13 and the pipe 26 to the expansion valve 27, controlled by a bulb 27a, and thence through pipe 28 to the pipe 29. The pipe 29 connects with the coil in the righthand plate 2 and the refrigerant passes through the coil in this plate and then by means of the pipe 30 into the second plate and through the coil in the second plate, and then by the pipe 31 into the third plate and through the coil in the third plate, and then by means of the pipe 32 into the fourth plate and through the coil in the fourth plate, and thence by pipe 33 into the fifth plate and through the coil in the fifth plate, and thence by pipe 34 back to the pipe 23 and thence to the compressor. The ice cream is placed between the plates in the ice cream receptacle and there is a top 35 and hinged covers 36 and 37 to secure access to this ice cream, see Fig. 2.

The sirup jars may be of any form or design desired and I have illustrated a number of these sirup jars in Fig. 2, located on opposite sides of the draft arms 9a and 11a for the water and the soda water. There is the usual counter 38 upon which the ice cream and drinks are served. The return pipe for the refrigerant material from the plates which cool the water and the soda water has a shut-off valve 39 therein and there is a bulb 40 on the inside of this water and soda water cooling device. This bulb shuts off the valve 39 so as to prevent the water and the soda water from freezing.

While one vacuum holdover plate may be used for cooling the water and the soda water, I have shown a construction where there are two such plates 7 with the cooling receptacle for the water and the soda water coils intermediate them, the water entering the water coil through the pipe 8 and passing out through the pipe 9, the soda water entering the soda water coil through the pipe 10 and passing out through the pipe 11. In this construction the return pipe 20 for the refrigerant material for the holdover plates connects with the coil in the holdover plate 7. The other end of this coil is connected to a pipe 41 which connects with the coil in the other holdover plate 7. The pipe 21 connects with the other end of this coil and leads back to the compressor.

Arrangement is made to start and stop the compressor to meet the requirements of the apparatus. One method for doing this is herein illustrated, wherein there is a bulb 42 connected with one of the plates in the ice cream receptacle by means of a clamp 43. There is a connection 44 from this bulb to the electric switch 45 which controls the motor 46. When the temperature falls below a predetermined point, the switch 45 is opened to stop the motor and the compressor. The holdover plates then keep the ice cream receptacle and the sirup jar receptacle and the bottle receptacle and the water and soda water receptacle in the proper cooled condition for a considerable length of time. When the temperature rises above a predetermined point, the electric switch is closed so as to start the compressor in operation. This causes the apparatus to cycle and the holdover plates greatly reduce the number of times the apparatus cycles in a given period of time, that is the number of times the compressor is started and stopped.

I claim:

A soda fountain comprising an ice cream receptacle, cooling plates in said receptacle for cooling the ice cream to a comparatively low temperature comprising hermetically sealed tanks having pipes extending back and forth therein through which refrigerant material passes, and eutectic material partially filling the tanks, air being exhausted from the tanks to press the sides thereof against said pipes, a sirup jar receptacle, a cooling device therefor for cooling it to a higher temperature than the ice cream receptacle comprising a hermetically sealed tank having a pipe extending back and forth therein, through which refrigerant material passes, eutectic material partially filling said tank, air being exhausted from the tank to cause the sides to press against said pipe, a refrigerating unit comprising a motor and a compressor with which said pipes are connected, a switch for starting and stopping said motor and compressor, a controlling device for said switch associated with said ice cream receptacle and separate automatic means for separately controlling the flow of refrigerant material through the pipes in the tank in sirup jar cooling receptacle.

HERMAN W. KLEIST.